(12) United States Patent
Lauterbach et al.

(10) Patent No.: US 11,506,227 B2
(45) Date of Patent: Nov. 22, 2022

(54) ENERGY SUPPLY UNIT FOR ACTIVE CHASSIS SYSTEM

(71) Applicant: RAPA Automotive GmbH & Co. KG, Selb (DE)

(72) Inventors: Frank Lauterbach, Selb (DE); Falk Lehniger, Selb (DE); Rocco Kemnitz, Selb (DE)

(73) Assignee: RAPA Automotive GmbH & Co. KG, Selb (DE)

( * ) Notice: Subject to any disclaimer, the term of this patent is extended or adjusted under 35 U.S.C. 154(b) by 156 days.

(21) Appl. No.: 16/866,625

(22) Filed: May 5, 2020

(65) Prior Publication Data

US 2020/0355202 A1 Nov. 12, 2020

(30) Foreign Application Priority Data

May 8, 2019 (DE) ...................... 10 2019 111 980.4

(51) Int. Cl.
*F15B 11/08* (2006.01)
*B60G 9/02* (2006.01)
(Continued)

(52) U.S. Cl.
CPC ................ *F15B 11/08* (2013.01); *B60G 9/02* (2013.01); *B60G 13/003* (2013.01); *B60G 17/08* (2013.01); *F16F 9/43* (2013.01); *B60G 2202/24* (2013.01); *B60G 2204/16* (2013.01); *B60G 2204/20* (2013.01); *B60G 2206/41* (2013.01);
(Continued)

(58) Field of Classification Search
CPC ......... F15B 11/08; B60G 9/02; B60G 13/003; B60G 17/08; B60G 2202/24; B60G 2204/16; B60G 2204/20; B60G 2206/41; B60G 2500/10; B60G 2800/162; B60G 13/08; B60G 13/00; B60G 2202/413; B60G 2202/416; F16F 9/43; F16F 2222/12; F16F 2228/066; F04B 23/04; F04C 2/10; F03G 7/08; F03G 7/081; F03G 7/085

See application file for complete search history.

(56) References Cited

U.S. PATENT DOCUMENTS 3,602,611 A * 8/1971 Oplander ................ F04D 13/14
417/78
5,211,031 A 5/1993 Murayama et al.
(Continued)

FOREIGN PATENT DOCUMENTS

CN 105889048 A 8/2016
DE 2 020 292 A1 11/1971
(Continued)

OTHER PUBLICATIONS

Extended European Search Report dated Oct. 12, 2020, in connection with corresponding EP Application No. 20173324.3 (33 pp., including machine-generated English translation).
(Continued)

*Primary Examiner* — Paul N Dickson
*Assistant Examiner* — Timothy Wilhelm
(74) *Attorney, Agent, or Firm* — Maier & Maier, PLLC

(57) ABSTRACT

A device for supplying hydraulic energy in a chassis system of a vehicle, including a first and a second motor-pump unit which are mechanically firmly connected to each other, the two motor-pump units preferably being designed identical in structure.

14 Claims, 3 Drawing Sheets

(51) Int. Cl.
  *F16F 9/43* (2006.01)
  *B60G 13/00* (2006.01)
  *B60G 17/08* (2006.01)
(52) U.S. Cl.
  CPC .... *B60G 2500/10* (2013.01); *B60G 2800/162* (2013.01); *F16F 2222/12* (2013.01); *F16F 2228/066* (2013.01)

(56) References Cited

U.S. PATENT DOCUMENTS

| | | | | |
|---|---|---|---|---|
| 5,388,761 | A * | 2/1995 | Langeman | B01F 15/00285 222/138 |
| 5,800,134 | A * | 9/1998 | Hasegawa | F04B 1/12 417/238 |
| 6,494,686 | B1 * | 12/2002 | Ward | F04B 1/324 417/199.1 |
| 6,736,605 | B2 * | 5/2004 | Ohashi | F04B 1/22 417/222.1 |
| 6,835,148 | B2 * | 12/2004 | Takebayashi | B62M 9/132 474/70 |
| 6,860,349 | B2 * | 3/2005 | Ogawa | H01M 8/04029 180/65.225 |
| 7,257,948 | B1 * | 8/2007 | Bennett | F04B 23/06 60/486 |
| 7,686,309 | B2 * | 3/2010 | Munday | B60G 21/06 280/5.507 |
| 7,726,126 | B1 * | 6/2010 | Hauser | F04B 23/06 60/486 |
| 7,788,919 | B2 * | 9/2010 | Ohashi | F16H 61/4139 60/484 |
| 7,806,667 | B1 * | 10/2010 | Hauser | F04B 1/2064 417/269 |
| 7,900,737 | B2 * | 3/2011 | Isogai | B60T 7/06 180/305 |
| 7,942,225 | B2 * | 5/2011 | Carabelli | F03G 7/08 180/165 |
| 7,942,649 | B2 * | 5/2011 | Lesther | F04C 11/001 417/410.4 |
| 9,115,720 | B2 * | 8/2015 | Rosinski | H02K 5/225 |
| 9,222,486 | B2 * | 12/2015 | Kadlicko | F15B 21/14 |
| 9,352,633 | B2 * | 5/2016 | Kim | B60G 17/0272 |
| 9,562,534 | B2 * | 2/2017 | Rosinski | F04D 15/0066 |
| 9,587,639 | B2 * | 3/2017 | Rosinski | F04D 15/0066 |
| 9,702,349 | B2 * | 7/2017 | Anderson | B60G 17/019 |
| 9,746,005 | B2 * | 8/2017 | Kadlicko | F15B 11/17 |
| 9,752,590 | B2 * | 9/2017 | Rosinski | F04D 29/426 |
| 9,764,759 | B2 * | 9/2017 | Becker | B62D 5/18 |
| 9,908,407 | B1 * | 3/2018 | Bennett | B60K 17/105 |
| 9,945,377 | B2 | 4/2018 | Pippes et al. | |
| 11,117,435 | B2 * | 9/2021 | Liebold | B60G 17/08 |
| 2007/0122298 | A1 | 5/2007 | Lesther et al. | |
| 2008/0257626 | A1 * | 10/2008 | Carabelli | F03G 7/08 180/165 |
| 2009/0297370 | A1 | 12/2009 | Moldovan et al. | |
| 2015/0308435 | A1 * | 10/2015 | Rosinski | F04D 13/14 417/2 |
| 2016/0265520 | A1 | 9/2016 | Skinner, Jr. et al. | |
| 2017/0218833 | A1 * | 8/2017 | Mitteer | F01P 7/14 |
| 2021/0008942 | A1 * | 1/2021 | Kemnitz | F04C 2/10 |
| 2021/0088036 | A1 * | 3/2021 | Schubart | F04B 27/053 |

FOREIGN PATENT DOCUMENTS

| | | |
|---|---|---|
| DE | 3 902 743 C1 | 7/1990 |
| DE | 10 2012 204 211 A1 | 9/2013 |
| DE | 10 2012 204 212 A1 | 9/2013 |
| DE | 10 2014 103 958 A1 | 9/2015 |
| DE | 10 2014 103 959 A1 | 9/2015 |
| EP | 1 369 586 A2 | 12/2003 |
| EP | 2 025 934 A1 | 2/2009 |
| EP | 3 144 472 A1 | 3/2017 |
| WO | 2017/040792 A1 | 3/2017 |

OTHER PUBLICATIONS

Examination Report dated Apr. 7, 2020 in corresponding German application No. 10 2019 111 980.4; 7 pages.

* cited by examiner

ENERGY SUPPLY UNIT FOR ACTIVE CHASSIS SYSTEM

FIELD

The present invention relates to a device for supplying hydraulic energy in an active chassis of a vehicle, a kit for such a device and a chassis system having such a device.

BACKGROUND

Active chassis systems are known in principle, for example from DE 39 02 743 C1 or DE 2 020 292 A1. An active chassis has hydraulically controllable shock absorbers in which the two cylinder chambers or damper chambers of the working cylinder of a given shock absorber are connected to each other not only via one or several, where applicable controllable, damping or throttle valves, but in which the filling state of the cylinder chambers can be actively controlled and hydraulic forces can be introduced accordingly into the chassis as needed. For example, the two cylinder chambers of a shock absorber can be connected to each other via a hydraulic pump.

Hence, by pumping hydraulic fluid, for example pitching and/or rolling movements of the vehicle can be counteracted. Vice versa, such an arrangement of shock absorber, hydraulic pump and electric motor can in principle also be used to feed electrical energy obtained by recuperation back into the vehicle's onboard electrical system. Furthermore, when using the pump different damping behaviours can be set, for example "soft" or "hard" or dynamic or depending on the road behaviour or the condition of the ground.

For controlling the electric motor of a given hydraulic pump, a corresponding control unit is usually provided here, thus creating a so-called motor-pump unit. It is known to provide for each shock absorber to be controlled exactly one motor-pump unit. Here, the corresponding motor-pump unit can be mounted directly to or at least close to the respective shock absorber. For reasons of installation space, however, this is not always possible, so that the corresponding motor-pump unit may have to be placed remote from the shock absorber in the vehicle. Attention must here be paid to the correct hydraulic connection and the correct electrical cabling.

SUMMARY

The object of the invention is to create a device for supplying hydraulic energy, in particular in an active chassis system of a vehicle, which can control two shock absorbers and allows simplified mounting. It is a further object of the present invention to state a corresponding kit and a corresponding chassis system.

The object is achieved by an object having the features of the independent claims. Preferred embodiments and developments are stated in the dependent claims.

According to the invention, a device for supplying hydraulic energy in a chassis system of a vehicle is supplied, comprising a first motor-pump unit and a second motor-pump unit different therefrom, which are mechanically connected to each other firmly or in a positionally fixed manner, so that these preferably form a pre-mountable or pre-mounted unit. The device according to the invention preferably comprises exactly two motor-pump units.

Thus, the device according to the invention forms a compact, space-saving mechanical unit which is provided for controlling two shock absorbers of a chassis system.

Since the device according to the invention is a pre-mountable or pre-mounted device, the mounting effort upon installation in a vehicle or chassis system is reduced compared to the mounting of individual motor-pump units. In particular, mounting time, mounting steps, fastening points and/or holding means are saved, since the motor-pump units for two shock absorbers can be built into in the chassis system or in the vehicle in one mounting step and as one complete component.

Here, the two motor-pump units are preferably identical in structure, that means, they have the same properties and dimensions or are designed identically.

The mechanically firm connection of the two motor-pump units can be created by one or several connecting components, preferably via connecting rods or screws, particularly preferably via exactly three, four, six or eight connecting rods or screws, and in an advantageous embodiment the two motor-pump units are arranged directly adjacent to each other, that is, they have a distance equal to zero. Likewise, the mechanically firm connection of the two motor-pump units can also be created via a common support on which the motor-pump units are firmly mounted. Preferably, the support is a common housing in which the two motor-pump units are arranged either completely or partially. Here, the common housing can be configured to be sealing, for example splash-proof. The common housing preferably has a cylindrical or cuboidal outer shape.

In one embodiment, the motor-pump units respectively comprise a hydraulic pump with a pump port for hydraulically connecting to a chassis system's shock absorber respectively assigned to a motor-pump unit. The pump port of a hydraulic pump respectively comprises in particular two line ports for coupling two port lines for connecting with two pressure chambers of a shock absorber. The hydraulic pump is preferably an internal gear pump as known from DE 10 2014 103 958 A1 or DE 10 2014 103 959 A1. The disclosure of these prints in this regard is incorporated in the present print. Further, the motor-pump units respectively comprise an electric motor for driving the hydraulic pump (or vice versa), which electric motor is preferably configured as an electric motor generator and thus allows four-quadrant operation, which also allows recuperation operation in which hydraulic energy from the shock absorber is converted into electrical energy. Further, the motor-pump-units respectively include a control unit for controlling the electric motor or electric motor generator, which for simplicity's sake in the following is referred to as electric motor. Here, the hydraulic pump, the electric motor and the control unit preferably form a compact structural unit, which for example has a continuous housing which comprises these three sub-units and for example is sealing. The hydraulic pump here borders directly on the electric motor. Likewise, the control unit preferably borders directly on the electric motor.

Preferably, in the motor-pump units, the hydraulic pump and the electric motor and particularly preferably also the control unit are respectively arranged in a row or along a longitudinal direction of the respective motor-pump unit (with regard to their axes of symmetry and/or centres of gravity). The longitudinal direction of the respective motor-pump unit is defined, for example, by a straight motor axle shaft with which the electric motor drives the hydraulic pump (or vice versa). Accordingly, the control unit and the pump are preferably arranged on opposite sides of the electric motor, so that the electric motor is structurally arranged between the control unit and the pump. Alternatively, the control unit can also be arranged laterally or radially at the electric motor with respect to the longitudinal axis of the motor-pump unit. In particular in the case where the pump, electric motor and control unit are arranged in a row along a longitudinal direction, the side of the pump and/or control unit respectively facing away from the motor-pump unit is configured as a flat front face which preferably also forms the respective axial end of the motor-pump unit.

Preferably, the motor-pump units and/or the structural units created thereby respectively have a total length along the respective longitudinal axis in the range between 15 and 40 cm, which is preferably 15, 20, 25, 30, 35 or 40 cm, where each of the values mentioned can also represent an upper or lower limit of the value range mentioned. This allows an uncomplicated installation in a chassis system.

Preferably, the motor-pump units or at least their hydraulic pump and electric motor together have a completely or substantially cylindrical outer shape or a (common) outer housing around the respective longitudinal axis, with an outside diameter or maximum diameter in the range between 60 and 150 mm, which is preferably 60, 70, 80, 90, 100, 110, 120, 130 or 150 mm, where each of the values mentioned can also represent an upper or lower limit of the value range mentioned. The outer housing here is preferably substantially or completely closed and/or sealing (for instance splash-proof or waterproof).

Preferably, the maximum (continuous) power of the electric motor is in the range between 0.1 and 5 kW and is, for example, 0.1, 0.2, 0.5, 1, 1.5, 2, 2.5, 3, 4 or 5 kW, where each of the values mentioned can also represent an upper or lower limit of the value range mentioned. The operating pressure in the unloaded state is here preferably between 5 and 25 bar, peak values of more than 200 bar may occur during operation. The capacity of the hydraulic fluid is here preferably in the range between 15 and 30 l/min with pressure differences at the two line ports of the pump port of up to 30 bar. In particular with higher pressure differences, the volume flow is also dependent on the power or size of the motor-pump unit. With an electric motor having a power of between 3 and 5 kW or an outside diameter in the range between 90 and 120 mm, the volume flow is typically up to 10 l/min at a pressure difference in the range between 100 and 150 bar. The speeds of the electric motor and thus also that of the hydraulic pump are proportional to the volume flow. The maximum speeds are typically in the range between 5000 and 10,000 rpm.

Preferably, the motor-pump units or their respective control units respectively have exactly one control port, for example for a CAN bus, which may also include a supply voltage port, and exactly one power port, for example for 48 V, which may also be adapted as a high-voltage port for 400 V or 800 V, for example. Accordingly, the device of the invention preferably has a total of exactly two control ports and exactly two power ports.

As already mentioned, the motor-pump units preferably are configured to be four-quadrant-capable and for this purpose they have as an electric motor an electric motor generator. This allows an alternating or alternate operation as an electric drive and/or as an electric generator, with which, for example due to a pressure surge at the pump (for example due to a mechanical impact on a shock absorber) hydraulic energy can be recovered via the pump from a chassis system as electrical energy and fed into an onboard electrical system. For such an alternating operation, the use of an internal gear pump as a hydraulic pump is particularly advantageous, as this has a low mass inertia and a high volume efficiency and thus allows a highly dynamic alternating operation with minimal hysteresis and minimal energy losses. Alternating between generator operation and motor operation and vice versa here is preferably possible with a time resolution of up to 50 Hz and the control unit is also suitably configured for this purpose. In particular, the motor-pump units are preferably suitable to operate together with the damper both in the range of the vehicle bodywork frequency, up to 5 Hz, and also in the range of the wheel frequency, up to 15 Hz.

In a preferred embodiment, the longitudinal axes of both motor-pump units are on a common axis, which define a longitudinal axis or common longitudinal axis of the device, which is described hereinafter as an axial arrangement of the motor-pump units. Here, the hydraulic pumps, and preferably also the pump ports, are arranged on sides of the respective motor-pump units facing away from each other, so that the respective electric motors and, where applicable, also the respective control units are arranged between the pumps of the respective motor-pump units. Accordingly, the device of the invention in the present case has an elongated structure with a total length (measured, for example, between the pump ports and/or pump end faces or front faces of the two pumps) along the common longitudinal axis in the range between 20 and 90 cm, which is, for example, 20, 30, 40, 50, 59, 60, 70, 80 or 90 cm, where each of the mentioned values may also represent an upper or lower limit of the mentioned value range. Accordingly, the two motor-pump units or the opposing ends facing away from the respective pump side, which for example are configured as a flat front face, have a distance along the common longitudinal axis of 0 to 10 cm, which for example is 0.1, 2, 3, 5, 7 or 10 cm, where each of the mentioned values can also represent an upper or lower limit of the mentioned value range. In the simplest case, the motor-pump units rest directly against each other. However, it may be advantageous to provide a non-zero distance between the motor-pump units for cooling the control units or electric motors or for reducing the distance to the shock absorbers. With such an axial arrangement, a distance between the pump and the respective shock absorber can be minimized.

In an alternative, preferred embodiment, the longitudinal axes of the two motor-pump units are parallel to each other (and do not coincide) and/or the motor-pump units or their longitudinal axes are aligned parallel or anti-parallel, preferably in such a way that the two motor-pump units are shifted in the direction of the longitudinal axes or, particularly preferred, are arranged flush. When the motor-pump units are aligned parallel, the pump-side ends of the two motor-pump units lie in a common plane which is perpendicular to the longitudinal axes of the motor-pump units, and the control-unit-side or electric-motor-side ends of the two motor-pump units lie in a further common plane which is likewise perpendicular to the longitudinal axes of the motor-pump units. In the case of an anti-parallel alignment of the motor-pump units, accordingly, the pump-side end of one of the two motor-pump units lies in a common plane perpendicular to the longitudinal axes of the motor-pump units with the control-unit-side or electric-motor-side end of the respectively other motor-pump unit.

A kit according to the invention for supplying a device as described above for supplying hydraulic energy, in particular in a chassis system of a vehicle, comprises the first (10) and second (20) motor-pump unit as well as one or several connecting components and/or a common support for the two motor-pump units for connecting the two motor-pump units, where preferably the connecting components and/or the support stipulate a spatial arrangement of the motor-pump units relative to each other as described above. Alternatively or additionally, the kit also comprises a housing as described above which preferably forms a common housing for both motor-pump units.

A chassis system according to the invention for a vehicle comprises at least a first and a second hydraulically controllable shock absorber respectively having two damper or pressure chambers separated for example by a movable damper piston, which are preferably assigned to a common chassis axle or are arranged at this axis, as well as a device as described above for supplying hydraulic energy in a chassis system of a vehicle, the first motor-pump unit hydraulically connecting the pressure chambers of the first shock absorber to each other and the second motor-pump unit hydraulically connecting the pressure chambers of the second shock absorber to each other. In this way, for example, "soft" or "hard" damping can be set by, for example, the respective motor-pump unit more or less damping or throttling pressure surges from the chambers. In this case, the respective motor-pump unit is thus driven hydraulically, so that the electric motor can be operated as an electric motor generator and thus electrical energy can be recovered (recuperation). Furthermore, the zero or rest position of the shock absorber can also be actively set or set in targeted fashion and can also be changed during operation (active chassis). It is understood that the chassis system may have one or several further axles, each of which respectively may be equipped with a further device, according to the invention, for controlling the corresponding shock absorbers.

In the chassis system according to the invention, the length of the hydraulic lines between a motor-pump unit or its pump and the shock absorber is preferably in the range between 10 and 150 cm, which is, for example, 10, 20, 30, 40, 50, 60, 70, 80, 90, 100, 120 or 150 cm, where each of the mentioned values may also represent an upper or lower limit of the mentioned value range.

BRIEF DESCRIPTION OF THE DRAWINGS

The invention will hereinafter be described with reference to the attached drawings. The drawings are merely schematic representations and the invention is not limited to the specific embodiment examples shown.

DETAILED DESCRIPTION

Figure 1:
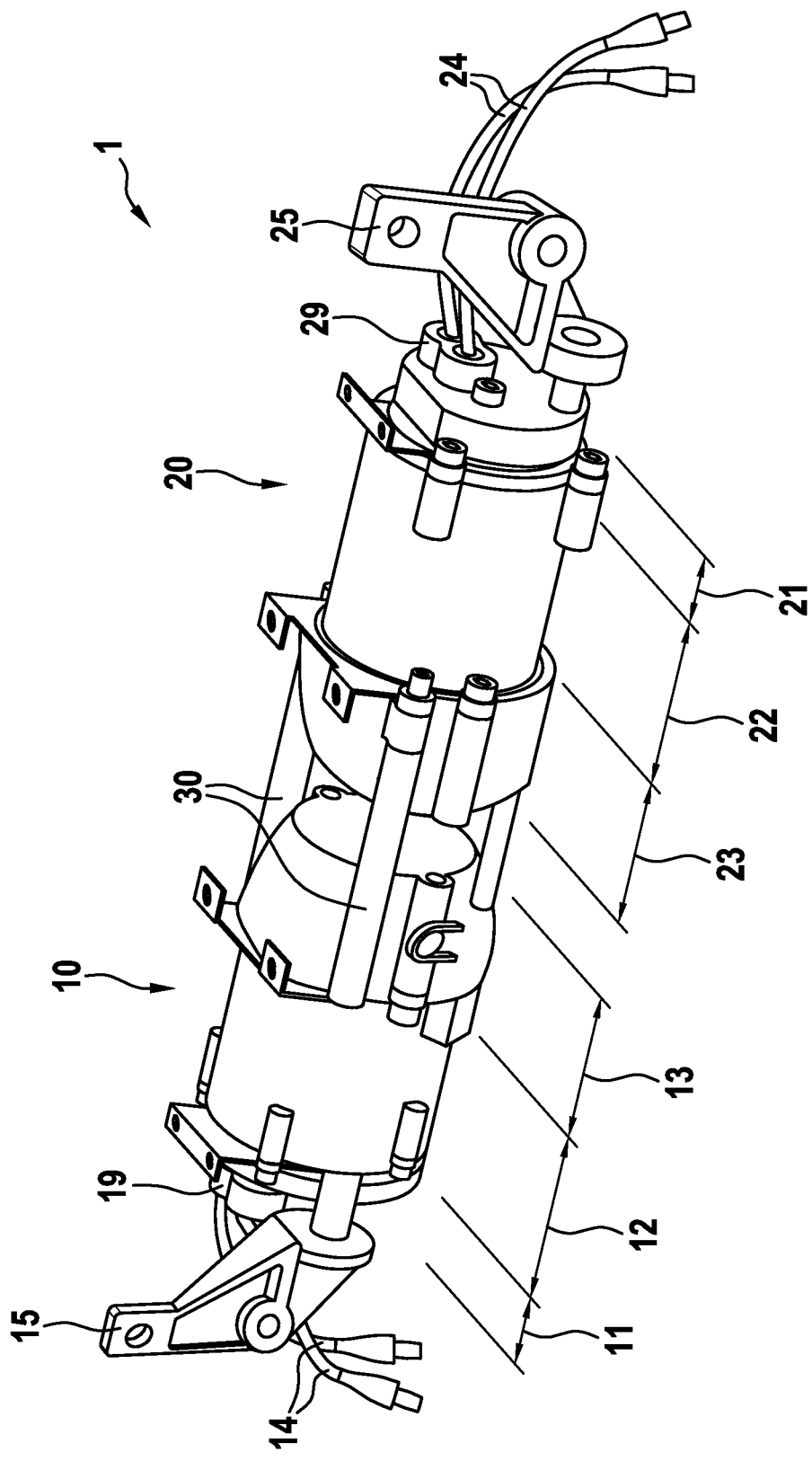
FIG. 1 shows a perspective view of a first embodiment example of the device according to the invention.

FIG. 1 shows a perspective view of a first embodiment example of a device 1 for supplying hydraulic energy in an active chassis system 2 of a vehicle. The device comprises a first 10 and a second 20 motor-pump unit, which are identical in structure or are designed identically and respectively comprise a hydraulic internal gear pump 11, 21, an electric motor or electric motor generator 12, 22 and an electronic control unit 13, 23 (ECU). Each of the motor-pump units 10, 20 forms a structural unit with a continuously closed, splash-proof outer shell or outer housing in which the pump 11, 21, the electric motor 12, 22 and the control unit 13, 23 are respectively arranged in a row along a longitudinal direction of the respective motor-pump unit 10, 20, so that the electric motor 12, 22 is respectively arranged between pump 11, 21 and control unit 13, 23. The longitudinal direction of a motor-pump unit 10, 20 is here defined by an inside straight motor axle shaft not shown, with which the electric motor 12, 22 drives the respective pump 11, 21. The pumps 11, 21 each have a pump port 19, 29 with two line ports, into which in the present embodiment examples two port lines 14, 24 are inserted respectively, which are provided for the coupling to the two pressure chambers of a shock absorber 16, 26 of an active chassis system 2, respectively.

In the first embodiment example, the two motor-pump units 10, 20 are arranged in an axial arrangement, that is, their respective longitudinal axes coincide and define the common longitudinal axis of the device 1 of the invention. In the first embodiment example, the two motor-pump units 10, 20 are firmly connected to each other by means of four connecting rods 30. Alternatively, for configuring the device according to the invention, instead of the connecting rods 30 there may also be provided a support 30' schematically shown in FIG. 2, for example in the form of a common housing. In the embodiment example shown, further, receiving means 15, 25 are provided for attaching the device according to the invention in a vehicle, for example in the vicinity of or at a vehicle axle or chassis axle 3.

In the first embodiment example, the device 1 according to the invention has a total length, from a pump port 19 to the opposing pump port 29, of 59 cm along the common longitudinal axis and, apart from fastening means, a substantially cylindrical outer shape with a diameter of approx. 120 mm. Furthermore, the control units 13, 23 of the two motor-pump units 10, 20 are opposite each other and respectively have a flat front face perpendicular to the longitudinal axes and spaced apart from each other approx. 30 mm Here, advantageously, the longitudinal axis of the device 1 according to the invention is parallel to the chassis axle 3 or to a connecting line of the wheels 18, 28 assigned to a chassis axle. On the one hand, this reduces the distance of the pump ports 19, 29 to the respective shock absorbers and, on the other hand, ensures sufficient cooling of the opposing control units 13, 23.

Figure 2:
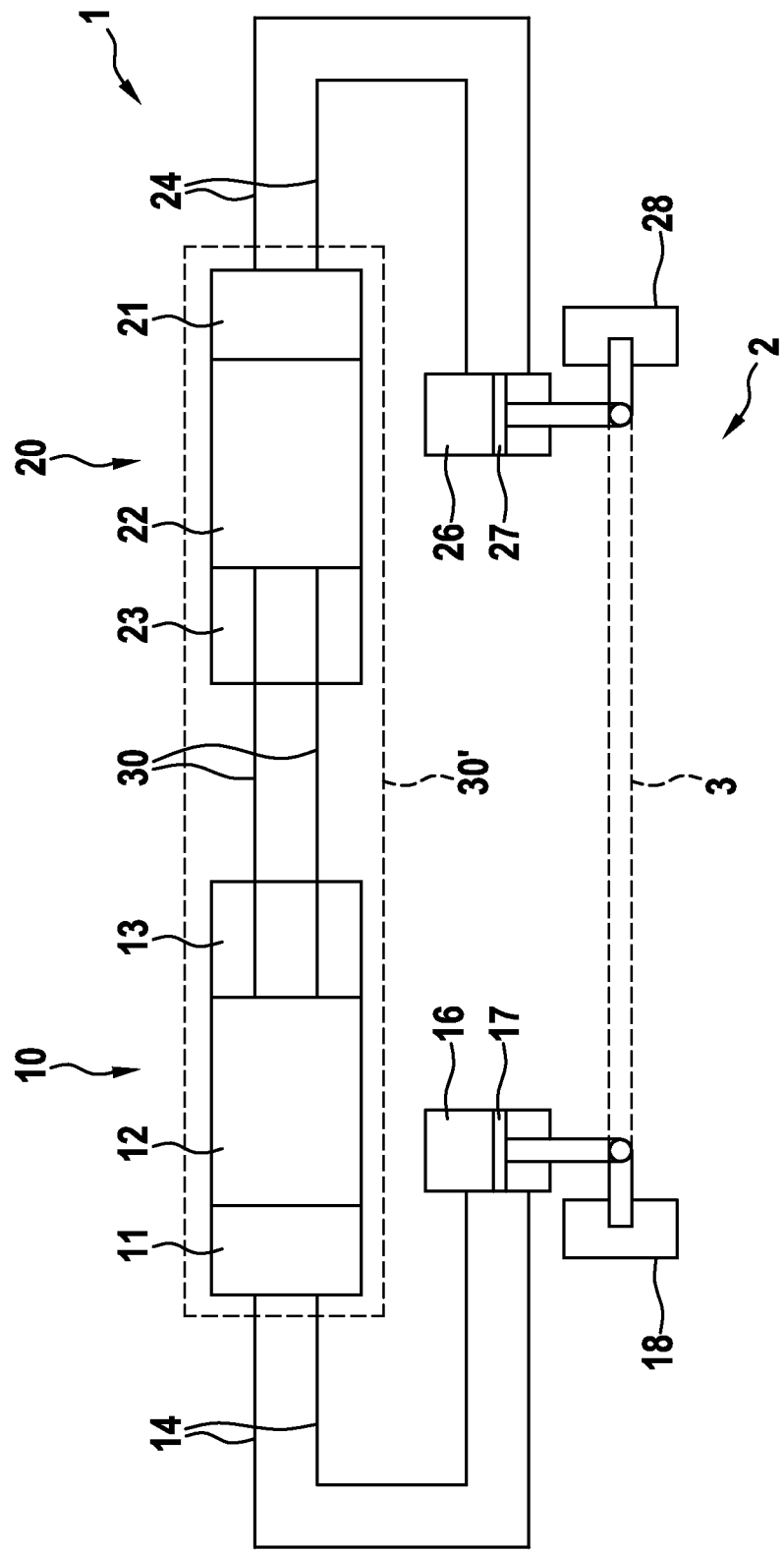
FIG. 2 shows a schematic view of a chassis system having a device according to the first embodiment example.

In FIG. 2, a chassis system 2 having a device 1 according to the invention is schematically represented according to the first embodiment example. Herein, the respectively two hydraulic lines 14, 24 respectively starting from the pumps 11, 21 are connected with the two pressure chambers of respectively one shock absorber 16, 26, which pressure chambers in the simplest case are separated by a piston 17, 27 adapted to axially travel in a damper cylinder. In the embodiment example shown, the cylinders of the shock absorbers 16, 26 are connected with the spring-suspended mass of the vehicle or body, while the piston 17, 27 is connected or coupled with the unsuspended mass of the vehicle or a wheel 18, 28 and, where applicable, also to a chassis axle 3, if present. However, this can also be designed vice versa. Furthermore, in the schematic diagram in FIG. 2, the spring elements usually provided in addition, such as an air and/or steel spring element, have been omitted.

Figure 3:
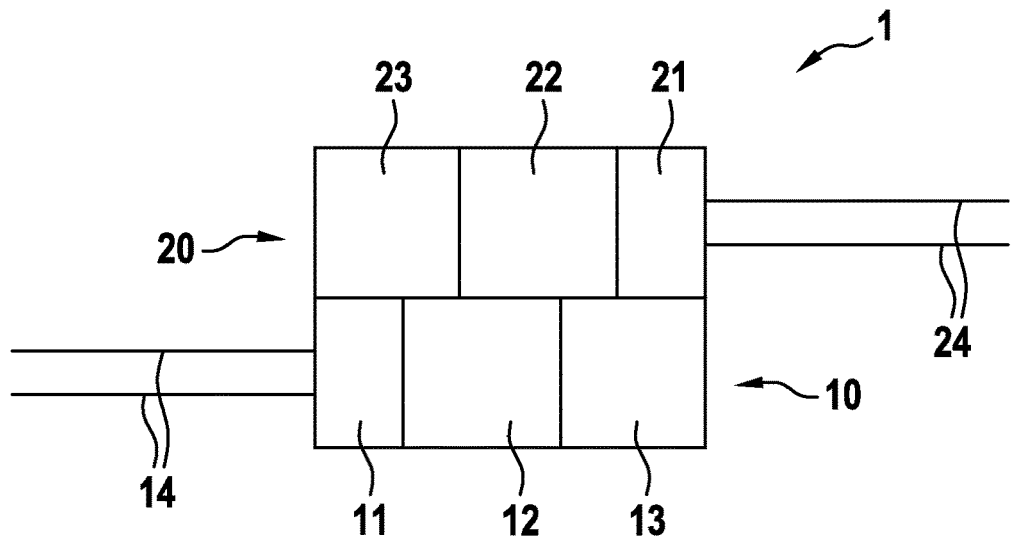
FIG. 3 shows a schematic view of a second embodiment example of the device according to the invention.

FIG. 3 shows a schematic view of a second embodiment example of the device 1 according to the invention, in which the longitudinal axes of both motor-pump units 10, 20 lie parallel, but in contrast to the first embodiment example do not coincide. The two motor-pump units 10, 20 here are arranged flush and anti-parallel, that is, the pumps 11, 21 point to opposite sides facing away from each other. It is advantageous to arrange the device 1 according to the invention in the vehicle or chassis system 2 in such a way that the parallel longitudinal axes of the two motor-pump units 10, 20 are also parallel to the chassis axle 3. However, in comparison with the first embodiment example, here the total length of the device 1 according to the invention along the longitudinal axis is reduced, substantially to the length of a motor-pump unit 10, 20 and thus halved, whereby, where applicable, an installation space available in the vehicle can be better utilized.

Figure 4:
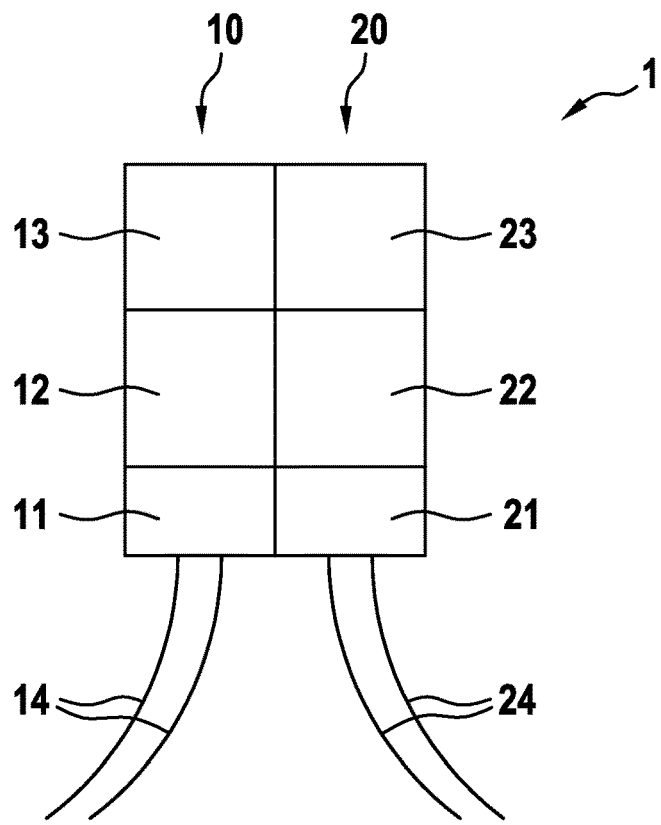
FIG. 4 shows a schematic view of a third embodiment example of the device according to the invention.

FIG. 4 shows a schematic view of a third embodiment example of the device 1 according to the invention, in which the longitudinal axes of both motor-pump units 10, 20 are again parallel and do not coincide. The two motor-pump units 10, 20 are also aligned flush but parallel. Accordingly, the pump-side ends of the two motor-pump units 10, 20 are arranged in a first plane which is perpendicular to the longitudinal axes of the two motor-pump units 10, 20, while the control-unit-side ends of the motor-pump units 10, 20 are arranged in a further common plane which is also perpendicular to the longitudinal directions of the motor-pump units 10, 20. Here, the longitudinal axes of the two motor-pump units 10, 20 advantageously are aligned perpendicular to a chassis axle 3.

The invention claimed is:

1. A device for supplying hydraulic energy in a chassis system of a vehicle, comprising:
a first motor pump unit mechanically connected to a second motor-pump unit, wherein the motor-pump units are designed identical in structure,
wherein each motor pump unit comprises a hydraulic internal gear pump with a pump port, an electric motor for driving the hydraulic pump, and a control unit for controlling the electric motor,
wherein the motor pump units are connected such that the control unit of each motor pump unit is between the electric motors, and wherein the electric motors are between the hydraulic pumps.

2. The device according to claim 1, wherein each motor-pump unit forms a structural unit.

3. The device according to claim 1, wherein the hydraulic pump, the electric motor, and the control unit are respectively arranged in a row or along a longitudinal direction or longitudinal axis inside the motor-pump unit, which is defined by a motor axle shaft of the electric motor.

4. The device according to claim 3, wherein the longitudinal axes of both motor-pump units lie on a common axis, which form a longitudinal axis of the device, and/or the hydraulic pumps respectively face away from each another.

5. The device according to claim 4, wherein the two motor-pump units have a distance of 0 to 10 cm.

6. The device according to claim 4, wherein the device has a total length in the range between 20 and 90 cm.

7. The device according to claim 1, wherein the motor-pump units have a total length in the range between 15 and 40 cm.

8. The device according to claim 1, wherein the motor-pump units or at least the hydraulic pump and electric motor thereof together have a cylindrical outer shape or housing with a diameter in the range between 60 and 150 mm.

9. The device according to claim 1, wherein the power of the electric motor of the motor-pump units is in the range between 0.1 and 5 kW.

10. The device according to claim 1, wherein the motor-pump units have a control port and a high-voltage power port.

11. A device according to claim 1, wherein the motor-pump units are four-quadrant-capable and/or in the motor-pump units the electric motor is respectively configured as an electric motor generator.

12. The device according to claim 1, wherein the mechanically firm connection of the motor-pump units is created via one or several connecting components comprising three, four, six or eight connecting rods or screws, or via a common support sealing housing.

13. A kit for supplying the device according to claim 12, wherein the first and second motor-pump unit as well as one or several connecting components or a support for connecting the two motor-pump units and/or a housing.

14. A chassis system for a vehicle, comprising: at least a first and second hydraulically controllable shock absorber which are assigned to a common chassis axle or are arranged at a common chassis axle, as well as a device according to claim 1, wherein the first motor-pump unit hydraulically connects pressure chambers of the first shock absorber and the second motor-pump unit hydraulically connects pressure chambers of the second shock absorber, and the device is arranged at the chassis axle.

* * * * *